(12) United States Patent
Lenke et al.

(10) Patent No.: US 11,499,633 B2
(45) Date of Patent: Nov. 15, 2022

(54) TRANSMISSION CASING WITH AN ELECTROMECHANICAL PARKING-LOCK ACTUATOR

(71) Applicant: FTE automotive GmbH, Ebern (DE)

(72) Inventors: Sonja Lenke, Ebern (DE); Samir (Sam) Elflein, Ebern (DE)

(73) Assignee: FTE automotive GmbH, Ebern (DE)

( * ) Notice: Subject to any disclaimer, the term of this patent is extended or adjusted under 35 U.S.C. 154(b) by 260 days.

(21) Appl. No.: 16/718,478

(22) Filed: Dec. 18, 2019

(65) Prior Publication Data

US 2020/0200270 A1 Jun. 25, 2020

(30) Foreign Application Priority Data

Dec. 20, 2018 (DE) .................... 10 2018 133 266.1

(51) Int. Cl.
*F16H 63/34* (2006.01)

(52) U.S. Cl.
CPC ..... *F16H 63/3433* (2013.01); *F16H 63/3466* (2013.01); *F16H 63/3475* (2013.01); *F16H 63/3491* (2013.01)

(58) Field of Classification Search
CPC .................. B60T 1/005; F16H 63/3416–3491
See application file for complete search history.

(56) References Cited

U.S. PATENT DOCUMENTS

| 4,369,867 | A | 1/1983 | Lemieux |
| 6,273,232 | B1 | 8/2001 | Kimura et al. |
| 9,272,690 | B2 * | 3/2016 | Burgardt ................ F16H 63/18 |

(Continued)

FOREIGN PATENT DOCUMENTS

| CN | 102338213 A | 2/2012 |
| DE | 102 12 038 A1 | 10/2003 |

(Continued)

OTHER PUBLICATIONS

German Search Report dated Nov. 13, 2019 in German Application 10 2018 133 266.1 filed on Dec. 20, 2018 (with English Translation of Categories of Cited Documents & Written Opinion), 10 pages.

(Continued)

*Primary Examiner* — David R Morris
*Assistant Examiner* — James J Taylor, II
(74) *Attorney, Agent, or Firm* — Oblon, McClelland, Maier & Neustadt, L.L.P.

(57) ABSTRACT

A transmission for a drivetrain of a motor vehicle, including a transmission casing which is or can be at least partially filled with oil and wherein a parking lock is arranged, wherein the parking lock includes a parking lock gear, which is connected rotationally conjointly to a transmission shaft and which has a locking toothing, and a locking pawl, which is mounted pivotably on the transmission casing and which has a locking tooth which, when the locking pawl is pivoted into a locking position, can be placed in positive locking engagement with the locking toothing of the parking lock gear, wherein the locking pawl is actuatable by an electromechanical parking-lock actuator which is arranged within the transmission casing. The invention furthermore relates to a motor vehicle which has a transmission of the type.

11 Claims, 4 Drawing Sheets

(56) References Cited

U.S. PATENT DOCUMENTS

| | | | |
|---|---|---|---|
| 10,208,858 B2* | 2/2019 | Rodrigues | B60T 1/062 |
| 10,605,360 B2* | 3/2020 | Nava Gonzalez | F16H 61/32 |
| 10,626,990 B2* | 4/2020 | Gausrab | B60T 1/005 |
| 10,746,297 B2* | 8/2020 | Li | F16H 57/039 |
| 2015/0143938 A1* | 5/2015 | Swaita | F16H 61/22 |
| | | | 74/473.12 |
| 2016/0298761 A1 | 10/2016 | Noto et al. | |
| 2018/0112774 A1 | 4/2018 | Littlefield et al. | |
| 2019/0383374 A1* | 12/2019 | Pfeiffer | F16H 63/3491 |
| 2020/0103015 A1* | 4/2020 | Okuhata | F16H 63/3416 |

FOREIGN PATENT DOCUMENTS

| | | |
|---|---|---|
| DE | 10 2014 221 056 A1 | 4/2016 |
| DE | 10 2016 014 523 A1 | 6/2018 |
| EP | 2 878 860 A1 | 6/2015 |
| WO | WO 2018/228686 A1 | 12/2018 |
| WO | WO 2020/064232 A1 | 4/2020 |

OTHER PUBLICATIONS

Extended European Search Report dated Feb. 14, 2020 in European Patent Application No. 19 216 140.4, 10 pages.

* cited by examiner

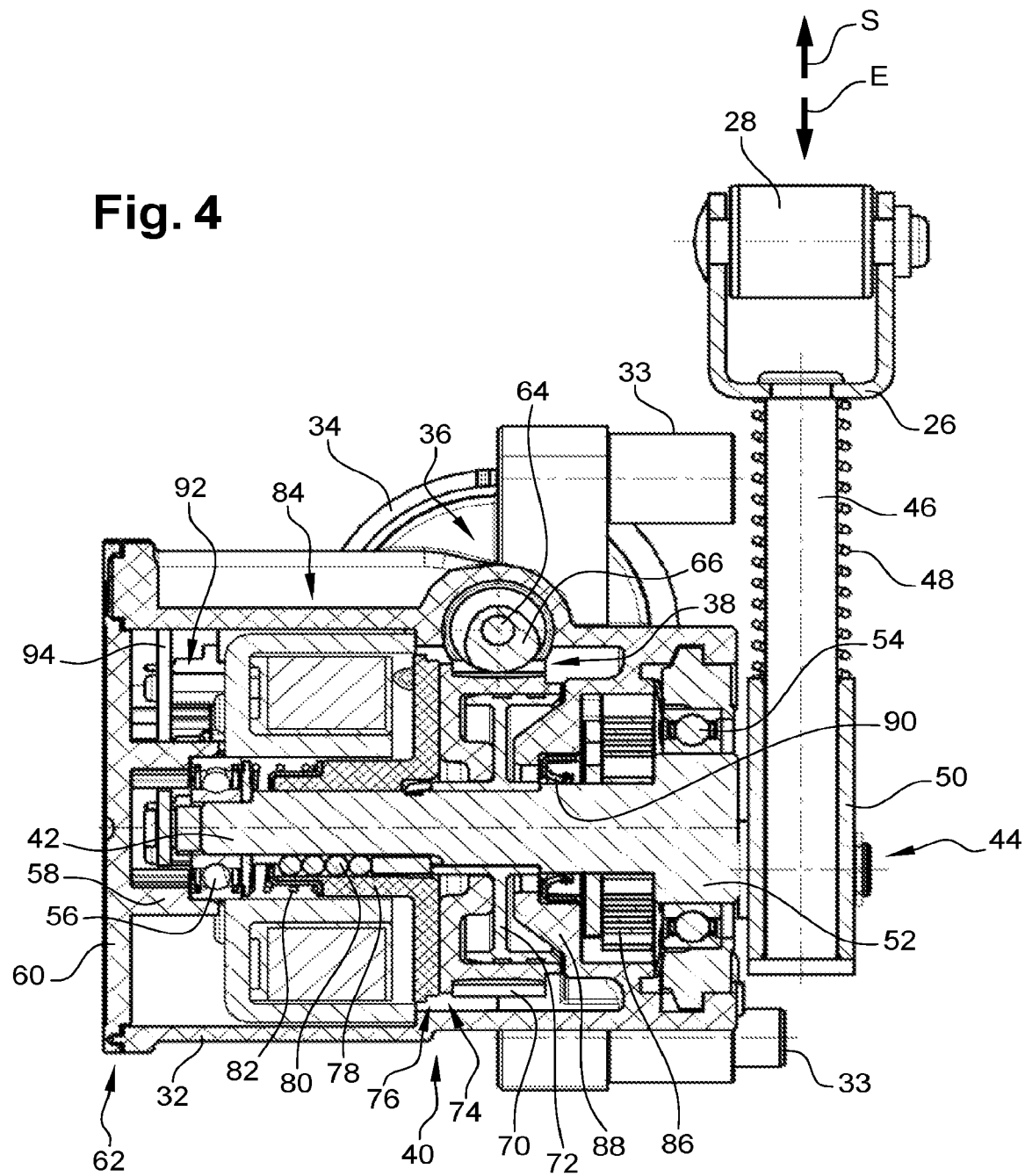

TRANSMISSION CASING WITH AN ELECTROMECHANICAL PARKING-LOCK ACTUATOR

BACKGROUND OF THE INVENTION

Field of the Invention

The present invention relates to a transmission which can be used in a drivetrain of a motor vehicle and which comprises a transmission casing which is or can be at least partially filled with oil and in which a parking lock is arranged.

Description of the Related Art

Parking locks serve, in a locking position, to prevent the motor vehicle from inadvertently rolling away. They are needed, in particular, when an inhibiting action of the stationary drive (motor) does not suffice for the purpose of holding the motor vehicle in place or cannot be utilised, for instance on account of normally open coupling elements. A locking of the drivetrain is then undertaken, as a rule, via a parking-lock gear arranged rotationally conjointly on a shaft of the transmission and exhibiting a toothing, which gear can be latched to the toothing in positively locking fashion by means of a parking-lock pawl mounted pivotably on a parallel axle. In this case, the parking-lock pawl has been biased by the force of a return spring either away from the parking-lock gear into an unlocked position or towards the parking-lock gear into the locking position. For the purpose of pivoting the parking-lock pawl contrary to the force of the return spring, parking-lock actuators are used, which serve to generate a linear motion or a motion extending at least substantially linearly, via which an actuating element—which, for instance, may have been designed in the form of a cam or a cone or a carrier with two rollers—is capable of being moved against the parking-lock pawl, in order to pivot the latter. In order to ensure that the parking lock can engage and consequently prevents the motor vehicle from rolling away even when the parking-lock pawl, upon actuation, comes to bear against a tooth of the parking-lock gear without entering into positively locking engagement with the toothing, an energy-storage device (advancing spring) has furthermore been provided on the actuating element, which in the case of a rolling of the motor vehicle advances the parking-lock pawl via the actuating element, so that said pawl enters into engagement with the toothing of the parking-lock gear.

Hydraulic or electrohydraulic or else electrical or electromechanical parking-lock actuators may be used for actuating the parking lock. Whereas a hydraulic cylinder effects the engagement and disengagement of the lock in the case of the hydraulic design, this process is performed by means of an electrical actuator in the case of the electromechanical design. Electric motors are commonly used for this purpose, though electromagnets may also be suitable for this purpose with corresponding configuration.

Electromechanical parking-lock actuators are known from the state of the art. Printed publication DE 102 12 038 A1 for example describes an electromechanical parking-lock actuator which includes an electric motor and a coupling device with two rotatably mounted coupling parts, of which one coupling part is operatively connected to the motor shaft of the electric motor via a gearing mechanism, whereas the second coupling part, which is selectively separable from said first coupling part, serves for displacing an actuating rod, which is articulated eccentrically thereon, in order to act on the locking pawl of a parking lock.

DE 10 2016 014 523 A1 has disclosed an electrical parking-lock actuator for actuating a parking lock in a motor vehicle, in the case of which an electric motor moves an actuating rod, which projects out of the casing and which on its free end bears an actuating element for actuating the parking lock, axially back and forth between a locking position and an unlocking position via a gearing mechanism accommodated in a casing.

BRIEF SUMMARY OF THE INVENTION

The present invention is based on the object of providing a space-saving and robust actuating means for a parking lock arranged in a transmission casing.

Said object is achieved according to the invention by means of a transmission disclosed herein. Advantageous embodiments and expedient refinements of the invention will emerge from the description or from the figures, wherein features described or presented here may constitute a subject of the invention on their own or in any desired combination, unless the context clearly opposes this.

In the case of a transmission designed for a drivetrain of a motor vehicle, which transmission comprises a transmission casing which is or can be at least partially filled with oil and in which a parking lock is arranged, which parking lock comprises a parking lock gear, which is connected rotationally conjointly to a transmission shaft and which has a locking toothing, and a locking pawl, which is mounted pivotably on the transmission casing and which has a locking tooth which, when the locking pawl is pivoted into a locking position, can be placed in positive locking engagement with the locking toothing of the parking lock gear, provision is made according to the invention whereby the locking pawl is actuatable by an electromechanical parking-lock actuator which is likewise arranged within the transmission casing.

A major advantage in the design according to the invention lies in the fact that the electromechanical parking-lock actuator, owing to its mounting in the transmission casing, takes up no additional structural space outside the transmission casing. Rather, said electromechanical parking-lock actuator can be installed in the transmission casing in the immediate vicinity of the parking lock, which simplifies the actuation of the locking pawl and leads to a compact design overall.

A further advantage consists in that the electromechanical parking-lock actuator is mounted in the transmission casing so as to be protected both against damage from external influences and against manipulation that would facilitate the theft of the vehicle.

Here, the invention in particular departs from the previous practice whereby only the hydraulic parking-lock actuators, which themselves operate with oil as operating medium, can also be mounted in a transmission casing filled with oil. According to the invention, it is thus the case that, for the actuation of a parking lock which is mounted in a transmission casing, containing oil, of a motor vehicle, an electromechanical parking-lock actuator is, despite its electrical components, likewise mounted in the transmission casing. This may advantageously also be realized in an in particular lower region of the transmission casing, wherein the parking-lock actuator is situated at least partially in a region of the transmission casing which is filled with oil.

It is particularly advantageous if the parking-lock actuator comprises an electric motor, the motor shaft of which is operatively connected to an actuating element which acts on a locking pawl of the parking lock. Other electrical actuators, in particular an electromagnet, are however alternatively also possible.

It is preferable here if the parking-lock actuator comprises an actuator casing in which an actuator shaft is rotatably mounted, which actuator shaft is operatively connected via a gearing mechanism such as a worm gear to the motor shaft of the electric motor and is designed for directly, or indirectly via interposed elements, driving an actuating element which acts on the locking pawl of the parking lock.

Accordingly, the actuator shaft may preferably, at its free shaft end, bear an eccentric by means of which an actuating rod articulated thereon can be displaced with a translational movement component, wherein the actuating rod directly or indirectly drives the actuating element which acts on the locking pawl of the parking lock.

It is particularly advantageous if the parking-lock actuator comprises a coupling device which acts in positively locking and/or non-positively locking fashion and which has two rotatably or pivotably mounted coupling parts, of which a first coupling part is operatively connected via the gearing mechanism to the motor shaft of the electric motor, while the second coupling part is mounted so as to be axially displaceable relative to the first coupling part and is connected rotationally conjointly, preferably by means of a linear ball bearing, to the actuator shaft. Furthermore, in the actuator casing, there may be provided a switching device, formed preferably by an electromagnet, for selectively opening or closing the coupling device. The first coupling part is driven in rotation by the electric motor via the gearing mechanism, which preferably comprises a self-locking worm gear. This rotational motion is, when the coupling is closed, transmitted to the second coupling part and thus to the actuator shaft, which is preferably connected rotationally conjointly to said second coupling part by means of a linear ball bearing. In the open state of the coupling device, the operative connection between the actuator shaft and the electric motor is separated, such that, in an emergency mode, a secondary drive, for example a spring, can drive the actuator shaft.

In a particularly preferred embodiment of the invention, the actuator casing has at least one dry interior space region which is sealingly closed off with respect to the oil present in the transmission casing and in which at least the electric motor and the gearing mechanism and a portion of the actuator shaft which is operatively connected, possibly separably, to the gearing mechanism are arranged, wherein the actuator shaft extends out of the dry interior space region through a radial shaft seal into an exterior region situated outside the dry interior space region, in order to be able to drive the actuating element which acts on the locking pawl of the parking lock. By contrast to the interior space region, said exterior region can come into contact with the oil present in the transmission casing.

Here, a particularly functionally reliable embodiment can be realized if the parking-lock actuator has a pressure equalization interface via which the dry interior space region is connected in liquid-tight fashion to the atmosphere prevailing within or outside the transmission casing, that is to say in particular to the air situated in the transmission casing or outside the transmission casing. This prevents a negative pressure from being able to form within the dry interior space region for example owing to temperature fluctuations, which negative pressure could in turn lead to an ingress of oil through leaks arising as a result of the negative pressure, and thus to damage to the components contained in the interior space region, in particular to electrical or electronic components. The pressure equalization interface may be realized in particular by means of a gas-permeable membrane or by means of an atmosphere connector which proceeds from the dry interior space region and which has a hose connected thereto and opening outside the transmission casing, or by means of the plug connector with a wiring harness of liquid-tight design adjoining said plug connector, by means of which wiring harness at least the electric motor of the electromechanical parking-lock actuator is connected to a control unit arranged outside the transmission casing.

The transmission may preferably be an automated dual-clutch transmission or an automatic transmission with a torque converter, or a continuously variable transmission (CVT) of a motor vehicle with an internal combustion engine or of a motor vehicle with a hybrid drive, which comprises in particular an internal combustion engine and an electric motor.

The same advantages may also be achieved in the case of motor vehicles with an electric motor drive, wherein the transmission may then in particular be a reduction transmission or a gearshift transmission.

The transmission according to the invention may furthermore also be a differential transmission or a transfer box of a motor vehicle.

The present invention furthermore relates to a motor vehicle which comprises a transmission of the type described above with a parking lock contained therein and with an electromechanical parking-lock actuator contained therein.

The present invention furthermore relates to the use of an electromechanical parking-lock actuator, which serves for actuating a parking lock, in a transmission of a motor vehicle.

BRIEF DESCRIPTION OF THE SEVERAL VIEWS OF THE DRAWINGS

Further advantages and features of the invention result from the following description relating to the embodiment examples represented in the drawings.

The figures show.

DETAILED DESCRIPTION OF THE INVENTION

Figure 1:
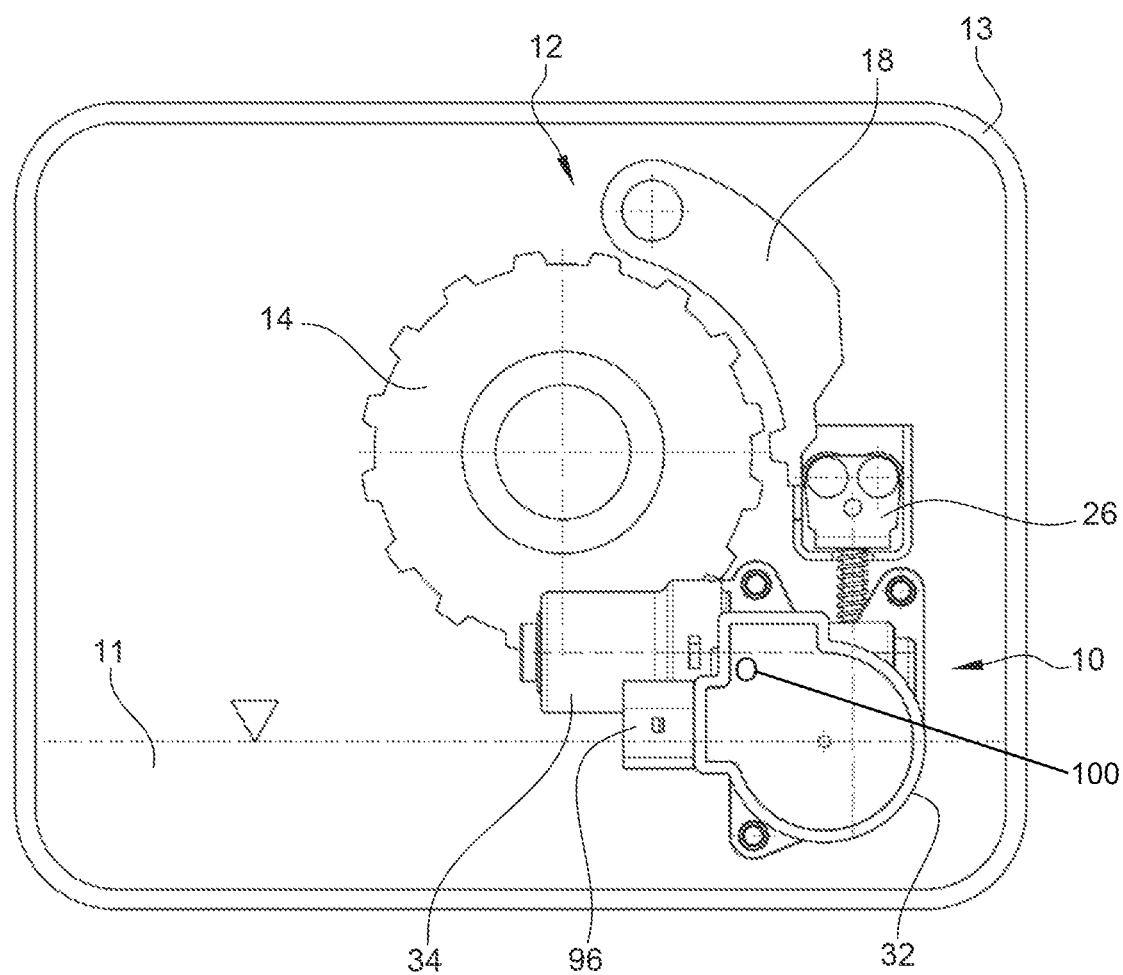
FIG. 1: schematic representation of a parking lock arranged in a transmission casing with an electromechanical parking-lock actuator arranged in accordance with the invention in the transmission casing.
Figure 2:
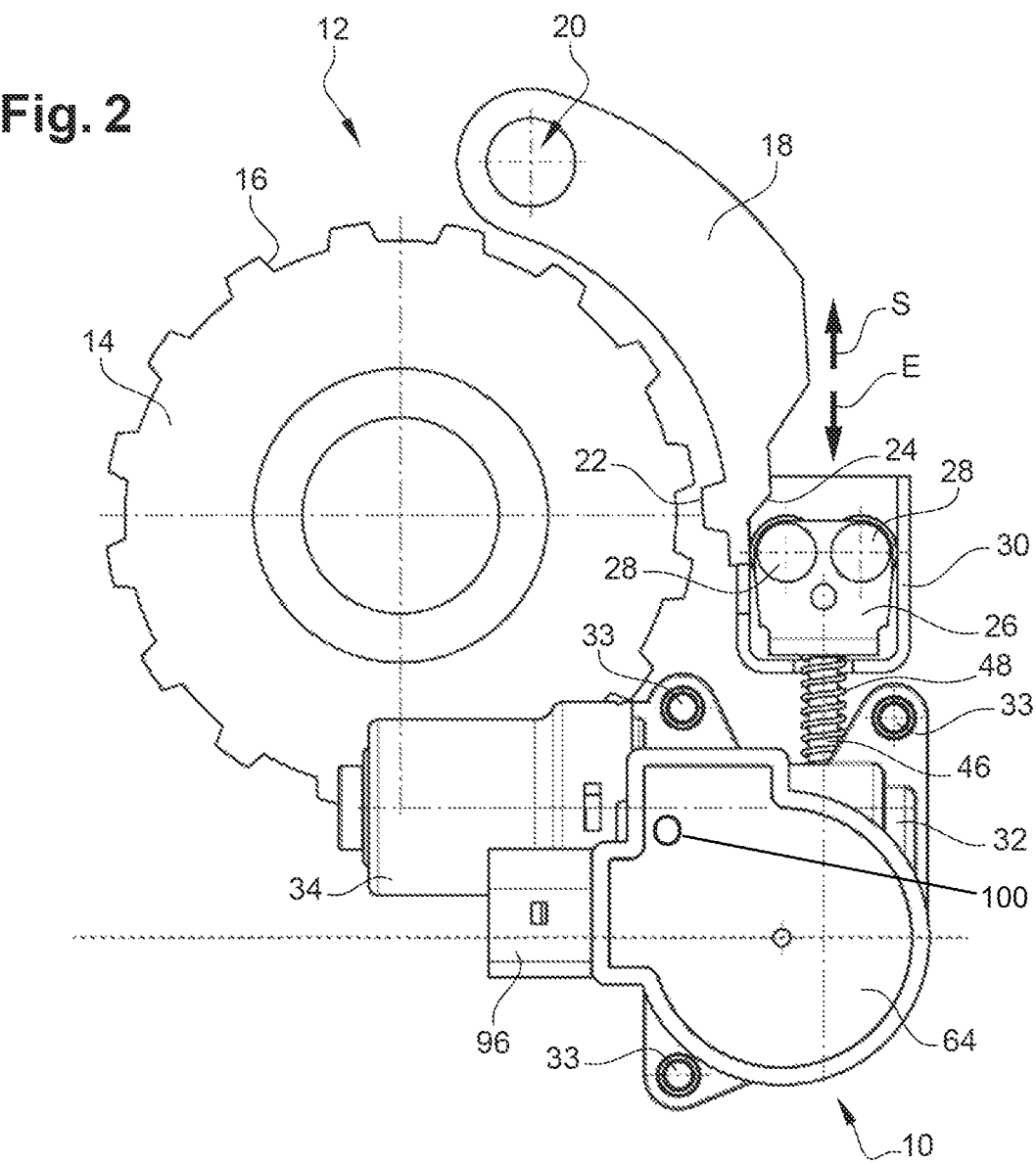
FIG. 2: enlarged representation of the parking lock with the electromechanical parking-lock actuator from FIG. 1, FIG. 3: perspectival view of the electromechanical parking-lock actuator from FIG. 1, and FIG. 4: a sectional view of the parking-lock actuator from FIG. 3.

FIGS. 1 and 2 show an electromechanical parking-lock actuator 10 which has been provided to actuate a parking lock 12 arranged in a motor vehicle. Not only the parking lock 12 but according to the invention also the parking-lock actuator 10 are in this case arranged within the transmission casing 13 indicated in FIG. 1, which transmission casing has been filled with oil 11 up to the indicated fill level. The parking lock 12 exhibits, in a manner known as such, a parking-lock gear 14 which is arranged in a rotationally conjoint and axially fixed manner on a transmission shaft, not represented, of a motor vehicle transmission and possesses a toothing 16 on its outer periphery. For the purpose of positive arresting of the drivetrain of the motor vehicle, the parking lock 12 further includes a locking pawl 18 which is articulated on the transmission casing so as to be capable of being pivoted about a pivot axis 20, and exhibits a latching tooth 22 which in the event of a pivoting of the locking pawl 18 about the pivot axis 20 is capable of engaging in positively locking fashion with the toothing 16 of the parking-lock gear 14. The locking pawl 18 is engaged by a return spring, likewise not represented here, which is supported with respect to the transmission casing or suspended thereon and which biases the locking pawl 18 away from the parking-lock gear 14 into an unlocked position.

Figure 3:
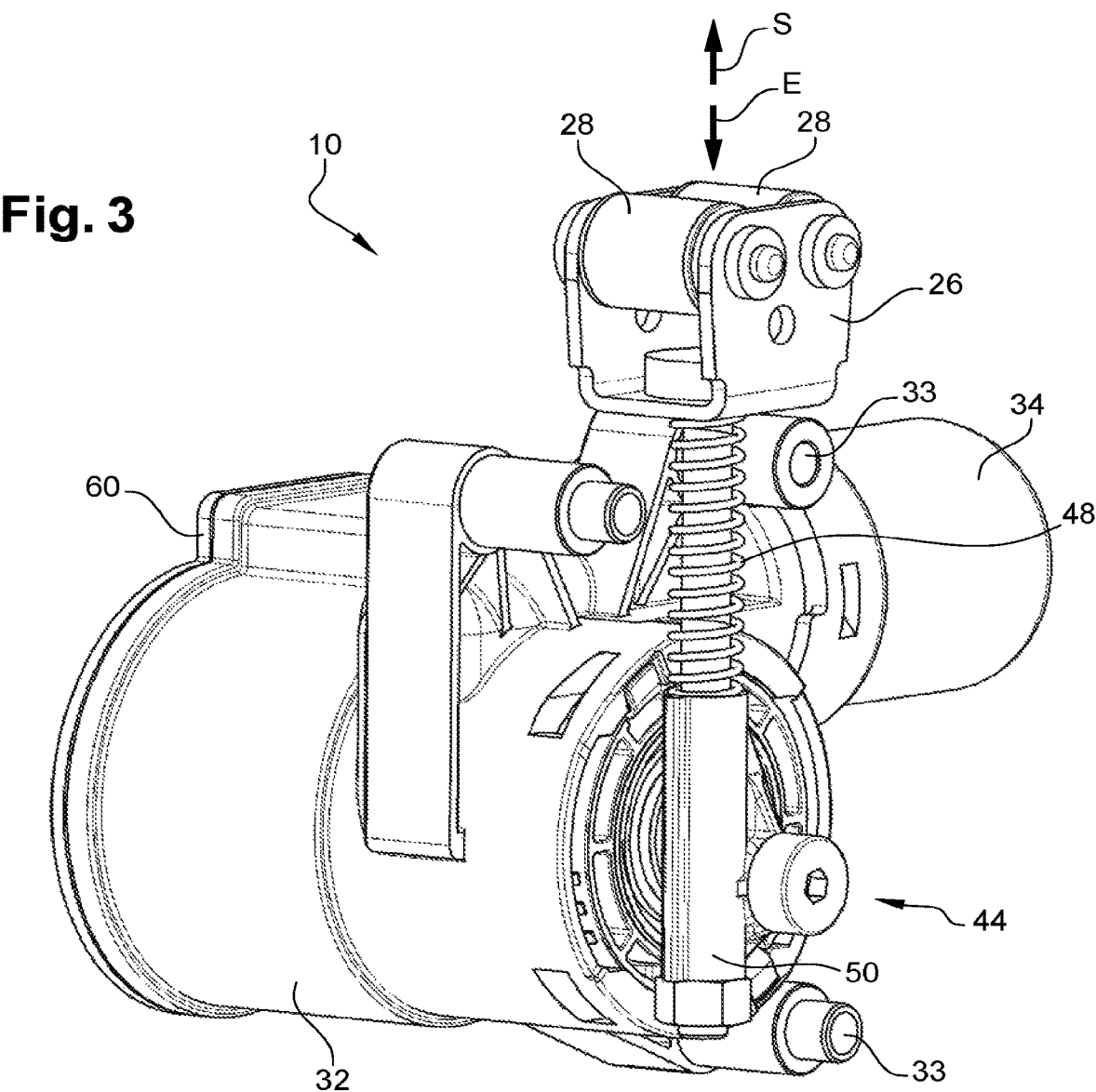

For the purpose of pivoting the locking pawl 18 about the pivot axis 20, an actuating element 26 is provided which in the embodiment example represented exhibits two rollers 28 and by means of the parking-lock actuator 10 can optionally be axially displaced in a locking direction S or in an unlocking direction E, as indicated by arrows in FIGS. 2 to 4. The two rollers 28 are guided in a guide element 30 which is fixed with respect to the transmission casing, so that in the event of an axial motion of the actuating element 26 in the locking direction S one of the rollers 28 impinges on a bevelled contact surface 24 of the locking pawl 18, whereas the other roller 28 is supported on the guide element 30. As a result, the locking pawl 18 is pivoted contrary to the force of the return spring, not represented in FIG. 1, in the clockwise direction, rotating about the pivot axis 20, in order to bring the latching tooth 22 into engagement in positively locking fashion with the toothing 16 of the parking-lock gear 14. In the event of an axial motion of the actuating element 26 in the unlocking direction E, on the other hand, the roller 28 is withdrawn from the contact surface 24, with the result that, in consequence of the force of the return spring in FIG. 1, the locking pawl 18 is pivoted in the anti-clockwise direction, rotating about the pivot axis 20, the latching tooth 22 being removed from the toothing 16 and thereby coming out of engagement with the parking-lock gear 14.

The parking-lock actuator 10 according to the invention shown in the embodiment example in FIG. 3 includes an actuator casing 32, preferentially injection-moulded from a synthetic material, on which fastening lugs 33 have been moulded which serve in the motor vehicle, in a manner known as such, for fastening the parking-lock actuator 10 to a wall of the transmission casing 13, for instance by means of screws. A motor casing 34, realised here separately, has been fastened to the actuator casing 32 via a bayonet joint, said motor casing receiving an electric motor 36 in its interior. Via a gearing mechanism 38 and a coupling device 40, the electric motor 36 serves to drive in rotation an actuator shaft 42 which via an eccentric device 44 converts the rotary motion into an axial motion, extending at least approximately axially, of an actuating rod 46 which bears the actuating element 26 for the parking lock 12. In a normal mode of the parking-lock actuator 10, the actuating rod 46 can be driven by the electric motor 36 in the locking direction S or conversely in the unlocking direction E. In this connection, an advancing spring 48, realised here as a helical compression spring, surrounding the actuating rod 46 biases the actuating rod 46 or, to be more precise, the actuating element 26 with respect to a guide sleeve 50 of the eccentric device 44 in the direction of the locking position.

In the following, the interior of the parking-lock actuator 10 according to the invention will be described in more detail. The actuator shaft 42 exhibits, at its front end facing towards the actuating rod 46, a shoulder 52 of enlarged diameter, which constitutes a crank web for the eccentric device 44 and is supported via a front bearing 54, realised here as a ball bearing. At its rear end region, the actuator shaft 42 is supported via a rear bearing 56 which is received in an internal projection 58 of a casing cover 60, by which the actuator casing 32 is sealed at the rear. In this connection, the casing cover 60 is connected to the actuator casing 32 in liquid-tight manner via positive locking elements 62 with interposed sealing means, and/or by a welded joint.

In the embodiment example represented here, the gearing mechanism 38 consists of a self-locking worm gear, in which a worm 66 fastened to the output shaft 64 of the electric motor 36 drives a peripheral toothing of a gearwheel 70. In consequence of the self-locking, the gearwheel 70 cannot be turned if the electric motor 36 has been switched off and in a current-free state. The gearwheel 70 is capable of being rotated relative to the actuator shaft 42 via a carrier 72 constituting a radial bearing, and is supported on the actuator shaft 42 so as to be axially fixed in position with respect to the actuator casing 32.

On its side facing towards the casing cover 60, the gearwheel 70 constitutes a first coupling part 74 which interacts with a second coupling part 76, arranged directly alongside it, of the coupling device 40. The coupling device 40 has been realised here as a switchable separable coupling, acting in positively locking fashion, in the form of a dog coupling. For this purpose, the second coupling part 76 includes a tubular sleeve portion 78 which by means of a linear ball bearing 80 is mounted on the actuator shaft 42 in an axially displaceable and rotationally conjoint manner. If the second coupling part 76 in the position represented in FIG. 4 bears axially against the first coupling part 74, the coupling device 40 has been closed. The dogs, not represented diagrammatically here, of both coupling parts 74 and 76 are then in engagement with one another, so that a torque is capable of being transmitted in both directions of rotation between the two coupling parts 74 and 76. If, on the other hand, the second coupling part 76 is removed from the first coupling part 74 by axial displacement on the actuator shaft 42, the dogs of both coupling parts 74 and 76 come out of engagement, so that the coupling device 40 has been opened and torque can no longer be transmitted between the two coupling parts 74 and 76, or, to be more precise, both coupling parts 74 and 76 are freely rotatable relative to one another. In particular, in the case of an open coupling device 40, the actuator shaft 42 connected rotationally conjointly to the second coupling part 76, and consequently also the actuating element 26 connected to said actuator shaft via the eccentric device 44 and the actuating rod 46, can accordingly be moved independently of the first coupling part 74 and of the electric motor 36 operatively connected to said coupling part via the self-locking worm gear.

On the coupling device 40 there is arranged a spring element 82, constituted here by a helical compression spring, which biases the coupling device 40 into its closed state represented in FIG. 4. Against the biasing force of this spring element 82, the coupling device 40 can be opened by energising an annular electromagnet 84, since the axially displaceable second coupling part 76 has been realised at least with constituent parts consisting of iron, and as a result constitutes an iron core which in the event of an energising of the electromagnet 84 as plunger is drawn so far into the coil of the electromagnet 84 against the biasing force of the spring element 82 until only the free end of the sleeve portion 78 bears against a disc arranged as an axial stop in front of the rear bearing 56.

For the purpose of forming a secondary drive which in the event of a malfunction of the primary drive constituted by the electric motor 36 can, in an emergency mode in the case of an open coupling device 40, rotate the actuator shaft 42 also independently of the electric motor 36, in the actuator casing 32 a spring device 86 has been provided which here is constituted by a spiral spring. The spiral spring 86 is fastened to the actuator shaft 42 on the inside and, after several turns surrounding the actuator shaft 42 in the form of a spiral, is fastened to a portion of the actuator casing 32 on the outside. In this way, the spiral spring 86 acts upon the actuator shaft 42 in a direction of rotation in which, in the case of an open coupling device 40, said actuator shaft moves the actuating element 26 in the locking direction S via the actuating rod 46, so that the locking pawl 18 is pivoted into the locking position by the energy stored in the spring device 86, and in this way the parking lock 12 is activated and the motor vehicle is immobilised. In this connection, the locking pawl 18 already reaches its locking position before the eccentric device 44 passes through its upper dead-centre position facing towards the locking pawl 18, so that the locking pawl 18 is held reliably in the locking position by the energy stored in the spring device 86 and also continuing to act on the actuator shaft 42.

When the malfunction has been eliminated, in the normal mode the parking lock 12 can be unlocked again by the electric motor 36, as a result of which the spiral spring 86 is also biased again into the previous state at the same time.

Axially between the spring device 86 and the carrier 72 of the gearwheel 70, a radial shaft seal 90 interacting with the actuator shaft 42 is arranged on a rib 88, protruding radially inwards, of the actuator casing 32. The radial shaft seal 90 seals off the dry interior space region 92, which is situated beyond the rib 88 as viewed from the eccentric device 44 (to the left of the rib 88 in FIG. 4), of the actuator casing 32, which interior space region contains in particular the coupling device 40, the electromagnet 84 and a printed circuit board 94, with electrical components possibly present thereon, in liquid-tight fashion with respect to the actuator shaft 42. This prevents the ingress of oil from the transmission casing 13 into the interior space region 92 of the actuator casing 32, which interior space region also includes the interior of the motor casing 34 with the electric motor 36 accommodated therein. Behind the guide sleeve 50, which guides the actuating rod 46, of the eccentric device 44, the oil present in the transmission casing 13 can come into contact with, and lubricate, only the front bearing 54 and the spiral spring 86.

The parking-lock actuator 10 has a common electrical interface 96 which is integrated into the actuator casing 32 and which is connected to the printed circuit board 94, which is situated in the rear region of the actuator casing 32 in front of the casing cover 60. Via the interface 96 and the printed circuit board 94, both the electric motor 36 and the electromagnet 84 can be connected to an external control unit and controlled by means of the latter. Furthermore, yet further electrical components of the parking-lock actuator 10, for example a position detector (not illustrated in the drawing here) for detecting the angular position of the actuator shaft 42, can likewise be connected by means of the printed circuit board 94 and the common electrical interface 96.

Additionally, the common electrical interface 96 in this case also performs a safety function, which allows for the particular installation situation according to the invention in the transmission casing 13. By means of a plug connector which is insertable in liquid-tight fashion into the common electrical interface 96 and which has a wiring harness (not illustrated) of liquid-tight design adjoining said plug connector, not only the connection of the stated electrical components to a control unit arranged outside the transmission casing 13 but also a pressure equalization interface 100 is created, by which the dry interior space region 92 is connected in liquid-tight fashion to the ambient air situated outside the transmission casing 13. In this way, the generation of negative pressures in the transmission casing 13, for example owing to temperature fluctuations, can be reliably prevented, such that an ingress of oil promoted by this, and associated damage to the electrical components contained in the interior space region 92, can also be prevented.

The invention claimed is:
1. A transmission for a drivetrain of a motor vehicle, comprising:
   a transmission casing which is or can be at least partially filled with oil and in which a parking lock is arranged,
   wherein the parking lock comprises a parking lock gear, which is connected rotationally conjointly to a transmission shaft and which has a locking toothing, and a locking pawl, which is mounted pivotably on the transmission casing and which has a locking tooth which, when the locking pawl is pivoted into a locking position, can be placed in positive locking engagement with the locking toothing of the parking lock gear,
   wherein the locking pawl is actuatable by an electromechanical parking-lock actuator,
   wherein the electromechanical parking-lock actuator is arranged within the transmission casing,
   wherein the parking-lock actuator comprises
      an electric motor including a motor shaft,
      an actuator casing, and
      an actuator shaft rotatably mounted in the actuator casing, the actuator shaft being operatively connected via a gearing mechanism to the motor shaft of the electric motor and driving an actuating element which acts on the locking pawl of the parking lock,
   wherein an actuating rod is articulated on the actuator shaft so as to convert rotary motion of the actuator shaft into movement of the actuating rod, the actuating rod driving the actuating element which acts on the locking pawl of the parking lock, and
   wherein the actuating element is provided on a free end of the actuating rod, the free end of the actuating rod being above the actuator shaft.
2. The transmission according to claim 1, wherein the parking-lock actuator is arranged at least partially in a region of the transmission casing which is filled with oil.
3. The transmission according to claim 1, wherein the actuating rod is eccentrically articulated on the actuator shaft.
4. The transmission according to claim 1, wherein the parking-lock actuator comprises a coupling device which has first and second coupling parts, the first coupling part is operatively connected via the gearing mechanism to the motor shaft of the electric motor, and the second coupling part is mounted so as to be axially displaceable relative to the first coupling part and is connected rotationally conjointly to the actuator shaft.
5. The transmission according to claim 1, wherein the actuator casing has a dry interior space region which is sealingly closed off with respect to oil and wherein at least the electric motor, the gearing mechanism and a portion of the actuator shaft which is operatively connected to the gearing mechanism are arranged, wherein the actuator shaft extends out of the dry interior space region through a radial shaft seal into an exterior region situated outside the dry interior space region, in order to drive the actuating element which acts on the locking pawl of the parking lock.

6. The transmission according to claim 5, wherein the parking-lock actuator has a pressure equalization interface via which the interior space region is connected in liquid-tight fashion to the atmosphere prevailing within or outside the transmission casing.

7. The transmission according to claim 1, wherein said transmission is an automated dual-clutch transmission or a torque-converter transmission or a continuously variable transmission of a motor vehicle with internal combustion engine drive or of a motor vehicle with a hybrid drive.

8. The transmission according to claim 1, wherein said transmission is a reduction transmission or a gearshift transmission of a motor vehicle with electric motor drive.

9. The transmission according to claim 1, wherein said transmission is a differential transmission or a transfer box of a motor vehicle.

10. A motor vehicle, wherein said motor vehicle has the transmission according to claim 1.

11. The transmission according to claim 1, wherein a front end of the actuator shaft facing towards the actuating rod includes a shoulder which constitutes a crank web for an eccentric device, and a rear end of the actuator shaft is supported by a rear bearing received in an internal projection of a casing cover by which the actuator casing is sealed.

* * * * *